United States Patent
Pezzutti et al.

(10) Patent No.: US 11,104,998 B2
(45) Date of Patent: Aug. 31, 2021

(54) COLD SPRAY REPAIR OF ENGINE COMPONENTS

(71) Applicant: General Electric Company, Schenectady, NY (US)

(72) Inventors: Mark Dean Pezzutti, Mason, OH (US); Leonardo Ajdelsztajn, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/517,550

(22) Filed: Jul. 20, 2019

(65) Prior Publication Data

US 2021/0017651 A1   Jan. 21, 2021

(51) Int. Cl.
    C23C 24/04     (2006.01)
    B23P 6/00      (2006.01)
    F01D 25/00     (2006.01)

(52) U.S. Cl.
    CPC .............. *C23C 24/04* (2013.01); *B23P 6/007* (2013.01); *F01D 25/007* (2013.01)

(58) Field of Classification Search
    None
    See application file for complete search history.

(56) References Cited

U.S. PATENT DOCUMENTS

| | | | |
|---|---|---|---|
| 6,491,208 B2 | 12/2002 | James et al. | |
| 7,360,678 B2 | 4/2008 | Pietruska et al. | |
| 7,367,488 B2 | 5/2008 | Payne et al. | |
| 8,343,573 B2 | 1/2013 | Jensen et al. | |
| 8,852,681 B2 | 10/2014 | Jakimov et al. | |
| 9,138,838 B2 | 9/2015 | Calla et al. | |
| 9,394,063 B2 | 7/2016 | Jackson et al. | |
| 1,032,903 A1 | 6/2019 | Choi et al. | |
| 2006/0045785 A1* | 3/2006 | Hu | F01D 5/005 419/5 |
| 2006/0121183 A1* | 6/2006 | DeBiccari | C23C 24/04 427/142 |
| 2008/0286459 A1 | 11/2008 | Cheung | |
| 2011/0293919 A1* | 12/2011 | Ajdelsztajn | B05B 7/205 428/323 |
| 2019/0009300 A1 | 1/2019 | Mahalingam et al. | |

FOREIGN PATENT DOCUMENTS

| | | |
|---|---|---|
| DE | 102007056451 A1 | 5/2009 |
| EP | 1666635 A1 | 6/2006 |
| EP | 2774710 A1 | 9/2014 |
| WO | WO 2019/110707 A1 | 6/2019 |

* cited by examiner

*Primary Examiner* — Michael P. Rodriguez
(74) *Attorney, Agent, or Firm* — Dority & Manning, P.A.

(57) ABSTRACT

A method is provided for adding material to a turbine engine component. The method includes cold spraying a powder towards a region of the component to form a deposit on the region of the component, the component being formed of a parent material, the parent material being a superalloy or a titanium alloy and defining a parent material property value, and the deposit defining a deposit material property value equal to at least fifty percent of the parent material property.

13 Claims, 4 Drawing Sheets

COLD SPRAY REPAIR OF ENGINE COMPONENTS

FIELD

The present subject matter relates generally to a repair process for engine components, such as a cold spray repair process for a structural component of a gas turbine engine.

BACKGROUND

Certain gas turbine engine components must be capable of withstanding relatively high temperatures and/or stresses during operation. For example, components exposed to heat generated at the downstream ends of the compressor section, heat generated by the combustion process within the combustor section, and heat within the turbine section may need to have the capability of withstanding high temperatures and/or stresses during operation of the gas turbine engine. Structural cases within, for example, the compressor section, combustor section, and turbine section of certain engines are subjected to high temperatures and strains during operation and therefore generally need to be capable of withstanding such high temperatures and strains.

Accordingly, certain of such components are formed through, e.g., a forging process of a high temperature and strain capable metal alloy, such as a nickel or titanium alloy. Nonetheless, over time these components may wear or corrode due to the environment within which they are installed. As such, these components must be either repaired or replaced.

Replacement is expensive and repair may be difficult. Traditionally, adding material to a high temperature metal alloy component is accomplished through, e.g., arc welding, laser welding, or thermal spray (such as plasma thermal spray or high-velocity oxygen fuel thermal spray). However, each of these methods alters a desired metallurgical microstructure of the material being added.

Accordingly, improved systems and methods for adding material to a high temperature metal alloy component without significantly altering the metallurgical microstructure of the material being added would be useful.

BRIEF DESCRIPTION

Aspects and advantages of the invention will be set forth in part in the following description, or may be obvious from the description, or may be learned through practice of the invention.

In one exemplary aspect of the present disclosure, a method is provided for adding material to a turbine engine component. The method includes cold spraying a powder towards a region of the component to form a deposit on the region of the component, the component being formed of a parent material, the parent material being a superalloy or a titanium alloy and defining a parent material property value, and the deposit defining a deposit material property value equal to at least fifty percent of the parent material property.

In another exemplary aspect of the present disclosure, a method for repairing a turbine engine component is provided. The method includes cold spraying a powder towards a region of the component, wherein cold spraying the powder towards the region of the component comprises directing a cold spray mix comprising a cold spray gas and the powder through a cold spray nozzle of a cold spray system towards the region of the component, wherein the cold spray system defines a gas temperature at an inlet of the cold spray nozzle greater than 650 degrees Celsius and less than 1500 degrees Celsius.

In an exemplary embodiment of the present disclosure, a structural component for a gas turbine engine is provided. The structural component includes a substrate formed of a superalloy or a titanium alloy and defining a repair region, the substrate defining a parent material property value; and a repair deposit cold sprayed onto the repair region of the substrate, the repair deposit defining a deposit material property value equal to at least fifty percent of the parent material property.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
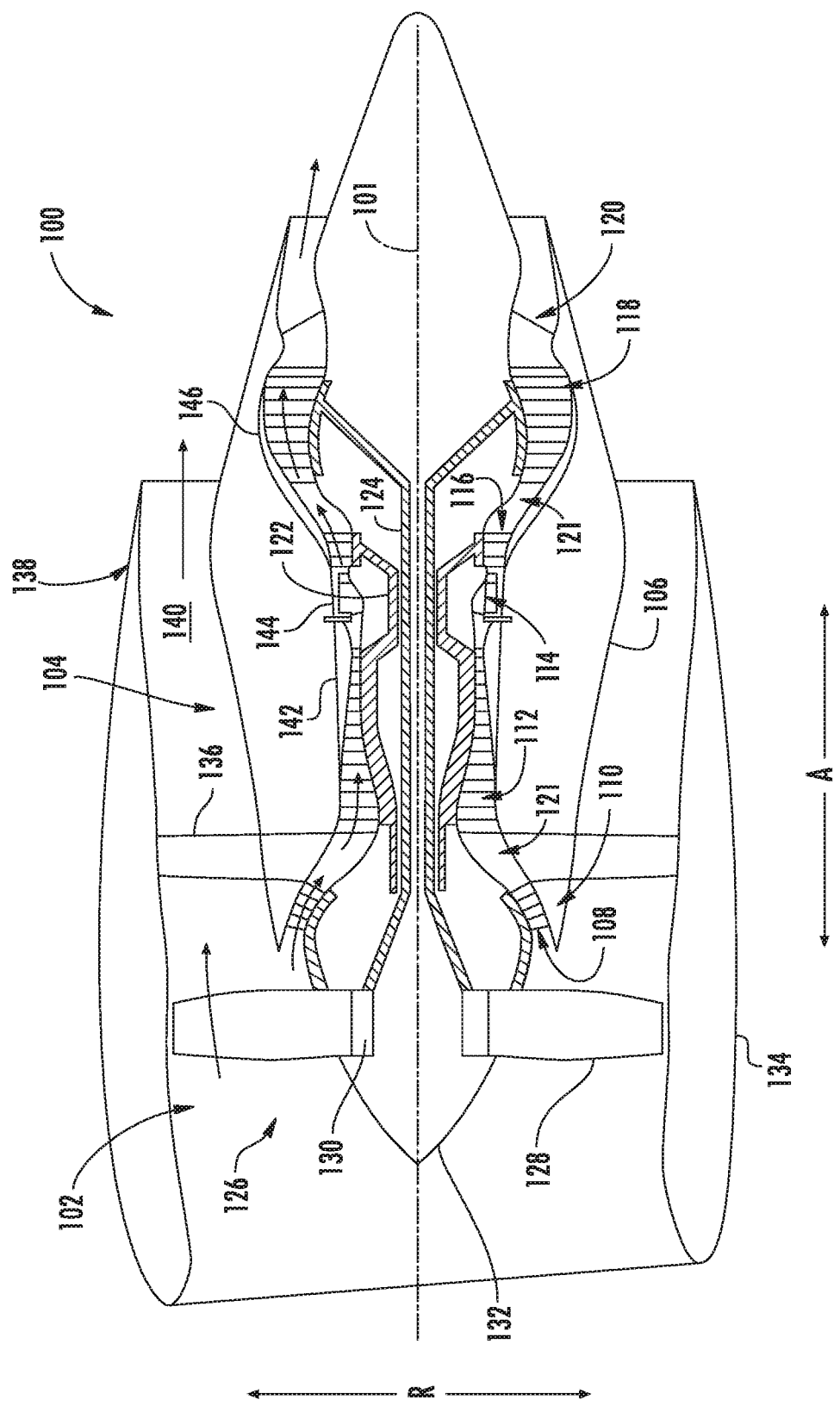
FIG. 1 is a schematic view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine mounted on, or incorporated into, an aircraft. Alternatively, however, the engine may be any other suitable type of engine for any other suitable vehicle, or for any other purpose (such as, e.g., power generation, land-vehicle propulsion, fluid pumping stations, etc.).

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a core jet exhaust nozzle section 120. The compressor section, combustion section 114, and turbine section together define at least in part a core air flowpath 121 extending from the annular inlet 108 to the jet nozzle exhaust section 120. The turbofan engine further includes one or more axial drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 101 by the LP shaft 124. The disk 130 is covered by rotatable front hub spinner 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define an annular fan bypass airflow passage 140 therebetween.

Referring still to FIG. 1, the turbofan engine 100 additionally includes one or more cases, such as one or more structural cases positioned therein. Each of the one or more structural cases may be provided to add structural rigidity to the turbofan engine 100. More specifically, for the embodiment depicted, the turbofan engine 100 includes a compressor casing 142, a combustor casing 144, and a turbine casing 146. Each of the compressor casing 142, combustor casing 144, and turbine casing 146 may generally be circular in shape extending in a circumferential direction substantially 360 degrees about the axial direction A and centerline 101 of the turbofan engine 100. Although not depicted, the turbofan engine 100 may additionally include additional casings within the compressor section, combustor section, and/or turbine section. Further, although not depicted, the exemplary turbofan engine 100 may additionally include one or more casings within the fan 126, outer nacelle 134, etc.

Moreover, it will be appreciated that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a marine or other aeroderivative gas turbine engine, etc.

Figure 2:
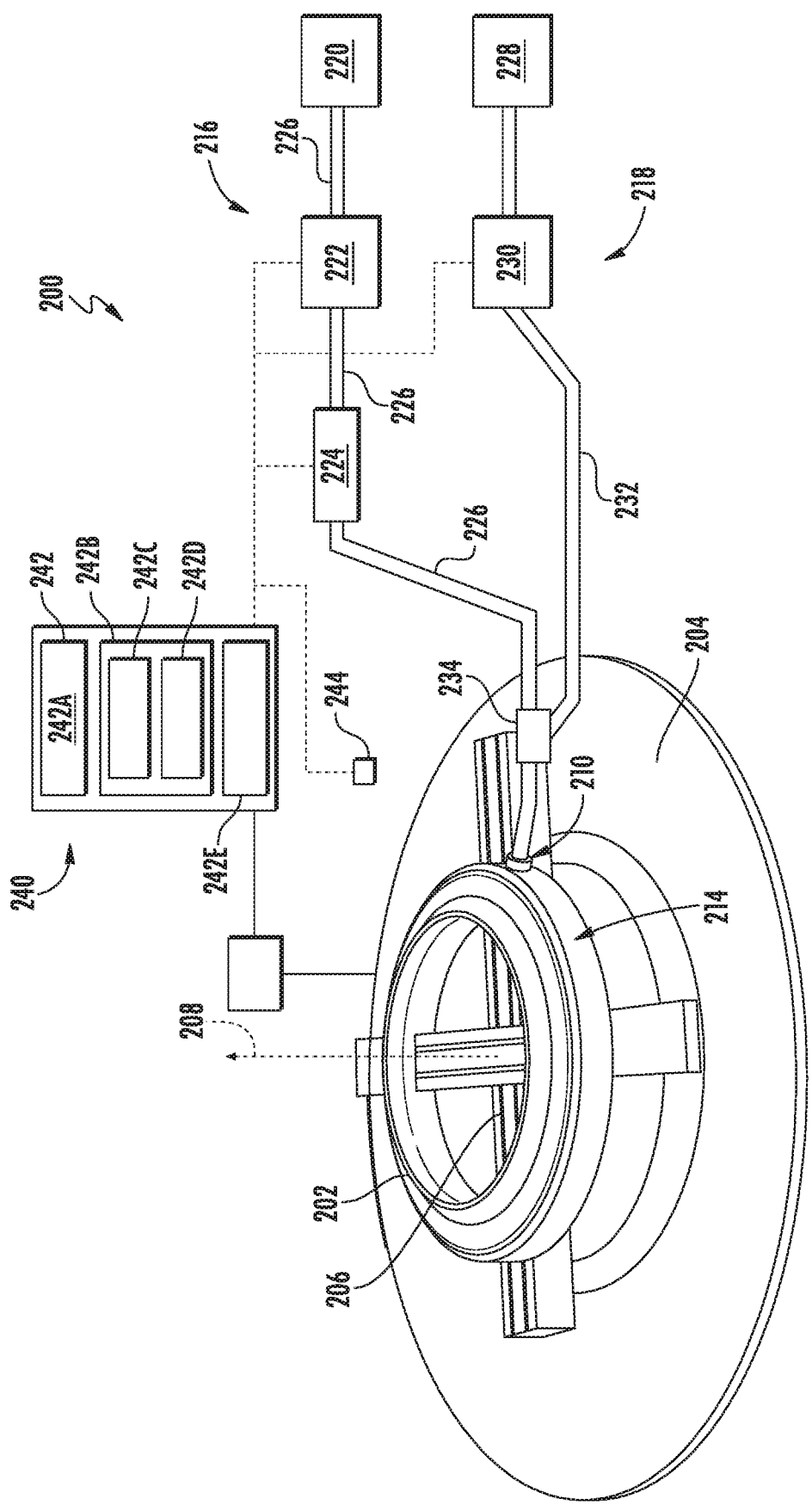
FIG. 2 is a schematic view of a cold spray system in accordance with an exemplary embodiment of the present disclosure.

Referring now to FIG. 2, a cold spray system 200 is depicted in accordance with an exemplary embodiment of the present disclosure for modifying a geometry of a component.

In certain exemplary embodiments, the cold spray system 200 depicted in FIG. 2 may be utilized to modify a geometry of an annular component.

In certain exemplary embodiments, the cold spray system 200 depicted in FIG. 2 may be utilized to repair an annular component.

In certain exemplary embodiments, the cold spray system 200 depicted in FIG. 2 may be utilized to add material to a high temperature metal superalloy component, such as a component formed of a nickel-based alloy or titanium-based alloy.

For the particular embodiment depicted in FIG. 2, the cold spray system 200 is utilized to repair a component 202 of a gas turbine engine, such as a casing of a gas turbine engine, such as one or more of the casings 142, 144, 146 described above with reference to FIG. 1. As will further be appreciated from the description, below, the cold spray system 200 depicted may be utilized to repair generally any component formed of a superalloy material, such as a titanium or nickel based superalloy, configured to withstand relatively high temperatures and/or strains within the gas turbine engine. Accordingly, it will be appreciated that the cold spray system 200 of the present disclosure may additionally or alternatively be used to repair a wide variety of other components and parts such as any other gas turbine engine component.

In other exemplary embodiments, the cold spray system 200 may be utilized to repair components other than gas turbine engine components.

Cold spraying is a technique in which dense and well-adhered deposits are formed due to the high velocity impact of powders on a substrate. The deposits formed do not undergo phase transformation during flight, and generally do not undergo oxidation. Moreover, due to the high velocity impact, the powders may undergo high strain at very high strain rates.

This technique is advantageous in that it provides sufficient energy to accelerate particles to high enough velocities such that upon impact the particles plastically deform and bond to the surface of the component on which they are being deposited so as to build a relatively dense coating or structural deposit. Cold spray does not metallurgically transform the particles from their solid state. The present cold spray system 200 and cold spray process described hereinbelow has been found to be useful in effecting repairs of components formed from superalloy materials. For example, the present cold spray system 200 and cold spray process described hereinbelow may be effective in building up parts that have lost material due to corrosion, erosion due to hot gas, rubbing against mating components, or impact with small particulate matter, and general wear.

Further, it will be appreciated that the cold spray process utilized with the present disclosure is a solid state process, and thus the powders utilized are not heated past their melting point. More specifically, the bonding mechanism employed by the cold spray method of the present disclosure for transforming the powdered repair material into a deposit is strictly solid state, such that the particles plastically deform but do not melt.

Referring particularly to the exemplary cold spray system 200 depicted in FIG. 2, the system 200 generally includes a platform 204 for holding the component 202 to be repaired, which for the embodiment depicted, is a casing. For the embodiment shown, the platform 204 includes a tool 206 for holding the component 202 in position (e.g., such as a brace, clamp, etc.). Moreover, for the embodiment shown, the platform 204 is configured to rotate about a centerline axis 208 (which for the embodiment shown is a common axis with the component 202 and the platform 204). In such a manner, the cold spray system 200 may be utilized to effectuate a repair of an annular region of the component 202. Notably, the platform 204 includes, for the embodiment shown, an electric motor configured to rotate the platform 204 about the centerline axis 208 at a desired rotational speed.

Further, the exemplary cold spray system 200 depicted in FIG. 2 includes a cold spray nozzle 210 configured to eject a cold spray mix 212 at a desired temperature, flow rate, speed, etc. onto the region 214 of the component 202 to be repaired (see, also, close-up of FIG. 3, discussed further below).

The cold spray nozzle 210 in the embodiment of FIG. 2 is in flow communication with a gas delivery network 216 and a powder delivery network 218. In such a manner, the cold spray nozzle 210 may receive a flow of the cold spray mix 212, including a flow of a cold spray gas and a powder, for ejecting onto the region 214 of the component 202 to be repaired.

For the embodiment shown, the gas delivery network 216 includes a gas source 220, a gas pump 222, a gas heater 224, and a gas conduit 226 fluidly coupling each of these components.

The gas source 220 for the exemplary gas delivery network 216 depicted may be any suitable gas source 220. For example, the gas source 220 may be a gas tank, a gas conversion unit configured to extract a desired gas from ambient air, etc. The gas pump 222 may similarly be any suitable gas pump 222 (also referred to as a gas compressor). For example, the gas pump 222 may be an electrical, rotary-type gas pump/compressor, a reciprocating gas pump/compressor, etc.

Notably, although the gas pump 222 and gas source 220 are depicted as separate components, in other embodiments, the gas source 220 may be a pressurized gas source such that the gas delivery network 216 does not include a separate gas pump 222 and gas source 220. Additionally, although the gas pump 222 is depicted downstream of the gas source 220, in other embodiments, the gas pump 222 may instead be positioned upstream of the gas source 220.

Although not depicted, the gas delivery network 216 may further include a pressure regulation device. The pressure regulation device may be incorporated into the gas pump 222, or alternatively, may be located in, or otherwise fluidly coupled to, the gas conduit 226 at a location downstream of the gas pump 222.

As is further depicted, the gas delivery network 216 further includes the gas heater 224. The gas heater 224 may be any suitable type of heater for increasing a temperature of the gas flow through the gas delivery network 216. In at least certain exemplary embodiments, the gas heater 224 may be an electric resistance heater thermally coupled to, or positioned at least partially within, the gas conduit 226 of the gas delivery network 216. However, in other embodiments, any other suitable type of gas heater 224 may be utilized, such as an air-to-air heat exchanger, an oil-to-air heat exchanger, any form of electrical resistance heater, etc. Further, although the gas heater 224 is located downstream of the gas pump 222 and gas source 220, in other embodiments, the gas heater 224 may instead be upstream of, or combined with, one or both of the gas pump 222 and gas source 220.

In such a manner, the gas delivery network 216 may be configured to provide a pressurized and heated gas flow through the gas conduit 226 to the cold spray nozzle 210. The gas delivery network 216 may be configured to provide such heated and pressurized gas flow at a desired temperature, pressure, and flow rate, as will be described in more detail below.

In at least certain exemplary aspects, the gas provided through the gas delivery network 216 may be one or more of a nitrogen gas, a helium gas, another inert gas, or mixtures thereof. In such a manner, the gas delivery network 216 may operate to provide a flow of non-oxidizing delivery gas for the cold spray system 200.

As noted above, the cold spray system 200 further includes the powder delivery network 218. The powder delivery network 218 generally includes a powder source 228, a powder feeder 230, and a powder conduit 232.

The powder source 228 may be any suitable container for holding the powder for the cold spray system 200. For example, in certain embodiments, the powder source 228 may be a hopper or other container. Although not depicted, the powder source 228 may further include one or more processing systems, such as a sieving system, in order to provide powder of a desired size distribution.

Further, the powder feeder 230 is in flow communication with the powder source 228 for feeding a flow of powder through the powder conduit 232. The feeder may be any suitable mechanism for providing the flow of powder through the powder conduit 232. For example, in certain exemplary embodiments, the powder delivery network 218 may be configured to utilize a gravity-fed feeder and powder source 228. However, in other exemplary embodiments, the powder feeder 230 of the powder delivery network 218 may utilize a compressed gas to drive the powder through the powder conduit 232. For example, in certain exemplary embodiments, the powder delivery network 218 may be in airflow communication with the gas delivery conduit 226 to receive a pressurized gas flow to urge a desired amount of powder through the powder conduit 232.

In certain exemplary embodiments, the powder utilized by the cold spray system 200 of FIG. 2 and delivered through the powder delivery network 218 may be a metal powder, such as a metal alloy powder. The metal powder may be of the same composition as the component 202 is made from or it may be a compatible composition. For example, the metal powder may be a powdered nickel-based superalloy, such as the nickel-based superalloy referred to as INCONEL alloy 718 by Special Metals Corporation, a powdered titanium-based alloy, such as Ti-6Al-4V, etc. Alternatively, the metal powder may be any other superalloy.

Further, in at least certain exemplary aspects, the powder utilized by the cold spray system 200 of FIG. 2 and delivered through the powder delivery network 218 may have a diameter in the range of about 5 microns to 100 microns. Generally, smaller particle sizes may enable the achievement of higher particle velocities and the associated benefits described herein.

It will further be appreciated that material composition transitions on the component 202 can be achieved by varying the powder composition in the powder source 228. Additionally, or alternatively, however, the powder delivery network 218 may further include a plurality of powder sources 228 in flow communication with the powder feeder 230, or alternatively, still, the powder delivery network 218 may include a plurality of powder sources 228 in flow communication with a respective plurality of powder feeders 230, each in flow communication with the powder conduit 232.

Referring still to FIG. 2, the cold spray system 200 further includes a mixer 234 in flow communication with the gas delivery network 216 and further in flow communication with the powder delivery network 218. The mixer 234 is configured to receive the flow of heated and pressurized gas from the gas delivery network 216, as well as the flow of powder from the powder delivery network 218, and mix and combine the two flows to form a cold spray mix 212. The mixer 234 is further in flow communication with the cold spray nozzle 210 to provide the cold spray nozzle 210 with the cold spray mix 212. The mixer 234 may simply be a Y-joint, or may include more advanced aero-mixing features, such as turbulators or the like. Other mixer configurations are contemplated as well.

Figure 3:
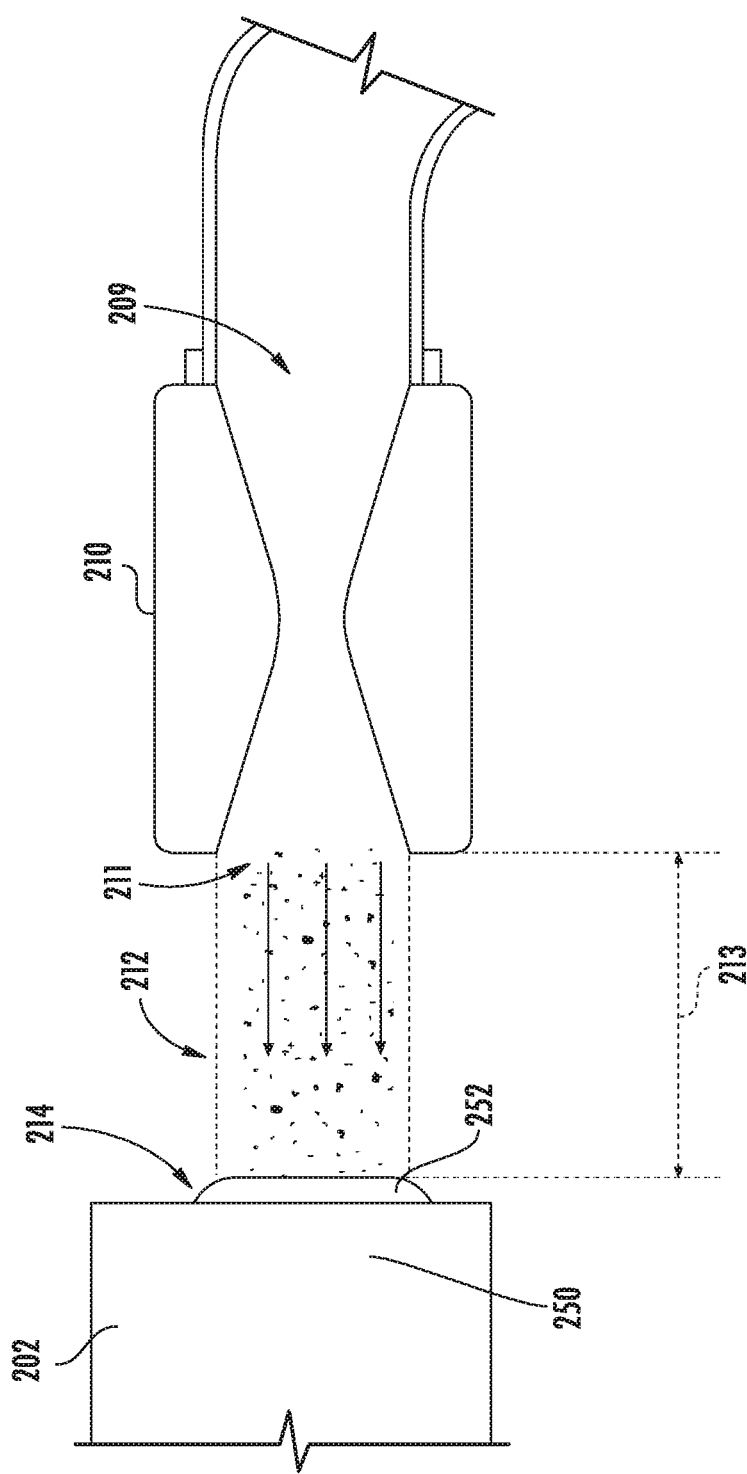
FIG. 3 is a close-up view of a cold spray nozzle of the cold spray system of FIG. 2.

More specifically, referring briefly to FIG. 3, providing a close-up, schematic view of the cold spray nozzle 210 ejecting the cold spray mix 212 onto a region 214 of the component 202, it will be appreciated that the cold spray system 200 is configured to eject the powder from the cold spray nozzle 210 at a desired exit velocity, enabled at least in part by providing the heated and pressurized gas to the cold spray nozzle 210 at a desired temperature and pressure, in order to effectuate the desired bonding of the powders to the region 214 of the component 202.

For example, the cold spray nozzle 210 depicted in FIG. 3 is configured as a converging/diverging nozzle, and generally defines a nozzle inlet 209 and a nozzle outlet 211. In at least certain exemplary aspects, the cold spray system 200 may be configured to eject the cold spray mix 212 from the outlet 211 of the cold spray nozzle 210 such that the cold spray system 200 defines a powder exit velocity at the outlet 211 of the cold spray nozzle 210 greater than 700 meters per second and less than 1300 meters per second. For example, the powder exit velocity at the outlet 211 of the cold spray nozzle 210 may be greater than 750 meters per second. Notably, the powder exit velocity refers to a velocity of the powder of the cold spray mix 212 exiting the cold spray nozzle 210.

Additionally, in at least certain exemplary aspects, the cold spray system 200 may be configured to operate with a relatively high temperature and pressure gas flow from the gas delivery network 216. In particular, in at least certain exemplary aspects, the cold spray system 200 may define a gas temperature at the inlet 209 of the cold spray nozzle 210 during operation of the cold spray system 200 greater than 650 degrees Celsius and less than 1500 degrees Celsius, such as greater than 700 degrees Celsius. Further, in at least certain exemplary aspects, the cold spray system 200 may additionally define a gas pressure at the inlet 209 of the cold spray nozzle 210 during operation of the cold spray system 200 greater than 30 bar and less than 100 bar.

Further, still, it will be appreciated that for the embodiment shown, the cold spray nozzle 210 is held at a relatively short distance from a surface of the component 202. This distance is known as the spray distance 213. The spray distance during operation of the cold spray system 200 is greater than about 5 millimeters (mm) and less than about 90 mm, such as less than about 60 mm.

The inventors of the present disclosure have found that operating the cold spray system 200 in accordance with one or more these operating parameters may allow for the cold spray system 200 to effectively add material to, or repair, components formed of a superalloy material (such as a nickel-based superalloy material), or of a titanium-based alloy material, or a combination thereof. In particular, the inventors of the present disclosure have found that operating the cold spray system 200 in accordance with one or more of these operating parameters in order to eject the powder at, e.g., the described speed, may allow for the cold spray system 200 to effectively add a material having similar material properties as the material properties of the underlying component/substrate, therefore maintaining a structural integrity of the component and meeting the metallurgical and mechanical properties necessary.

For example, referring still to FIG. 3, it will be appreciated that the component 202 includes a substrate 250 (formed of a superalloy or a titanium alloy) and defining the repair region 214. The substrate 250 defines a parent material property value. The component 202 additionally includes a repair deposit 252 cold sprayed onto the repair region 214 of the substrate 250. The repair deposit 252 is a buildup of the powders cold sprayed onto the repair region 214. The repair deposit 252 defines a deposit material property value equal to at least fifty percent of the parent material property value. For example, in certain exemplary embodiments, the deposit material property value is greater than 75 percent of the parent material property value, such as greater than 85 percent, such as greater than 90 percent. Further, in certain exemplary embodiments, the deposit material property value is less than 200 percent of the parent material property value, such as less than 150 percent of the parent material property value, such as less than 100 percent of the parent material property value.

In certain exemplary embodiments, the deposit material property value and the parent material property value are each describing the same material property, the material property being one of the following: a tensile strength, a yield strength, an elongation, a fatigue, a brittleness, a bulk modulus, a compressive strength, a creep, a ductility, an elasticity, a fatigue limit, a flexibility, a flexural strength, a fracture toughness, a hardness, a malleability, a plasticity, a resilience, a shear strength, a stiffness, or a toughness.

In certain exemplary embodiments, the deposit material property value and the parent material property value are each describing the same one of the following: a tensile strength, a yield strength, a creep, a flexural strength, a shear strength, or a stiffness.

By way of example only, in certain exemplary embodiments, the component 202, and substrate 250 of the component 202, may be formed of a titanium-alloy, such as Ti-6Al-4V. With such an exemplary embodiment, the parent material property value may be approximately 900 megapascals (MPa) describing yield strength of the material forming the substrate of the component 250. With such an exemplary embodiment, the deposit material property value may be at least 450 MPa similarly describing yield strength of the material forming the repair deposit 252 on the repair region of the component 250.

It will be appreciated that the above-described operating parameters are generally contrary to conventional teachings for cold spray processes, which operate at lower temperatures, pressures, speeds, etc. so as to, e.g., not overly heat the repaired component (potentially damaging components not designed to withstand certain high temperatures within gas turbine engines) and to conserve energy. For example, typical cold spray processes heat the carrier gas only enough to ensure it does not freeze or reach an undesirably low processing temperature when it exits an expansion portion of the cold spray nozzle. By contrast, the operating parameters described herein go beyond this minimum temperature to add additional energy to the powders to assist with the effectiveness of the cold spray process with the superalloy powders, while ensuring the powders do not change phase, thereby maintaining the mechanical integrity of the component.

Accordingly, by utilizing such a cold spray system 200 in accordance with one or more exemplary aspects of the present disclosure to add material to, or repair, such the components, the repaired components may have mechanical properties similar to the original mechanical properties of the component formed, e.g., using a forging process. As such, the exemplary cold spray system 200 and associated process discussed hereinbelow may be particularly beneficial in adding material to, or repairing, flanges, thin walls, etc.

Further, referring still to the embodiment of FIG. 2, it will be appreciated that the exemplary cold spray system 200 depicted further includes a controller 240 operable with various aspects of the cold spray system 200 for controlling operation of the cold spray system 200.

In one or more exemplary embodiments, the controller 240 depicted in FIG. 2 may be a stand-alone controller for the cold spray system 200, or alternatively, may be integrated into one or more other controllers/control systems. Referring particularly to the operation of the controller 240, in at least certain embodiments, the controller 240 can include one or more computing device(s) 242. The computing device(s) 242 can include one or more processor(s) 242A and one or more memory device(s) 242B. The one or more processor(s) 242A can include any suitable processing device, such as a microprocessor, microcontroller, integrated circuit, logic device, and/or other suitable processing device. The one or more memory device(s) 242B can include one or more computer-readable media, including, but not limited to, non-transitory computer-readable media, RAM, ROM, hard drives, flash drives, and/or other memory devices.

The one or more memory device(s) 242B can store information accessible by the one or more processor(s) 242A, including computer-readable instructions 242C that can be executed by the one or more processor(s) 242A. The instructions 242C can be any set of instructions that when executed by the one or more processor(s) 242A, cause the one or more processor(s) 242A to perform operations. In some embodiments, the instructions 242C can be executed by the one or more processor(s) 242A to cause the one or more processor(s) 242A to perform operations, such as any of the operations and functions for which the controller 240 and/or the computing device(s) 242 are configured, the operations for operating a cold spray system 200 (e.g., method 300), as described herein, and/or any other operations or functions of the one or more computing device(s) 242. The instructions 242C can be software written in any suitable programming language or can be implemented in hardware. Additionally, and/or alternatively, the instructions 242C can be executed in logically and/or virtually separate threads on processor(s) 242A. The memory device(s) 242B can further store data 242D that can be accessed by the processor(s) 242A. For example, the data 242D can include data indicative of power flows, data indicative of engine/aircraft operating conditions, and/or any other data and/or information described herein.

The computing device(s) 242 can also include a network interface 242E used to communicate, for example, with the other components of the cold spray system 200. For example, in the embodiment depicted, the cold spray system 200 further includes a sensor 244 configured to sense data indicative of one or more operating parameters or conditions of the cold spray system 200. Although a single sensor 244 is depicted schematically, it will be appreciated that the cold spray system 200 may include any suitable number of sensors to sense any suitable number of operating parameters or conditions (e.g., ambient temperature and/or pressure, rotational speed of the platform 204, temperature/pressure/flow rate of the cold spray mix 212, temperature/pressure/flow rate of the gas flow through the gas delivery network 216, temperature/pressure/flow rate of the powder flow through the powder delivery network 218, exit velocity of the cold spray mix 212 from the cold spray nozzle 210, exit temperature of the cold spray mix 212 from the cold spray nozzle 210, etc.).

The controller 240 the cold spray system 200 is operably coupled to the one or more sensors through, e.g., the network interface 242E, such that the controller 240 may receive data indicative of various operating parameters sensed by the one or more sensors during operation. Further, for the embodiment shown the controller 240 is operably coupled to various components of the cold spray system 200 for controlling aspects of the cold spray system 200. For example, in the embodiment depicted, the controller 240 is operably coupled to the gas pump 222, the gas heater 224, the powder feeder 230, and the motor of the platform 204. However, in other embodiments, the controller may additionally or alternatively be operably coupled to any other suitable component 202 of the cold spray system 200.

The network interface 242E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated from the description herein that a cold spray system in accordance with one or more exemplary embodiments of the present disclosure may be utilized to add material to a component.

For example, a cold spray system in accordance with one or more exemplary embodiments of the present disclosure may be utilized to repair a component.

Figure 4:
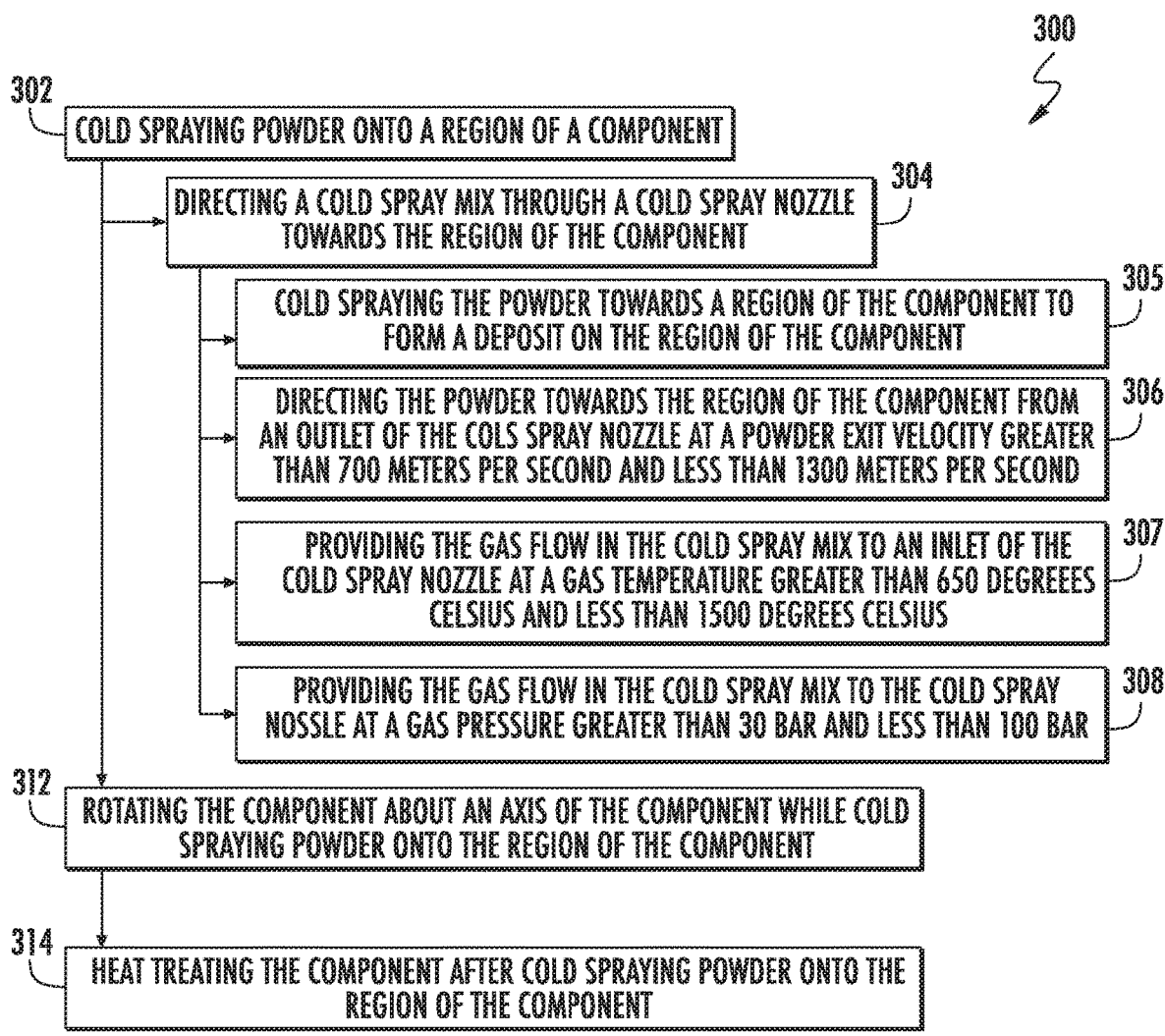
FIG. 4 is a flow diagram of a method for repairing a component of a gas turbine engine in accordance with an exemplary aspect of the present disclosure.

For example, referring now to FIG. 4, a method 300 for repairing a gas turbine engine component is provided. The method 300 may be utilized with one or more of the exemplary cold spray systems and components described above with respect to FIGS. 1 through 3. However, in other exemplary aspects of the present disclosure, the method 300 may be utilized with any other suitable cold spray system, component, etc.

The method 300 includes at (302) cold spraying powder onto a region of a component. Cold spraying powder onto the region of the component at (302) includes, for the exemplary aspect depicted, at (304) directing a cold spray mix through a cold spray nozzle towards the region of the component. The cold spray mix includes a cold spray gas and the powder. For the aspect of the method 300 depicted, directing the cold spray mix through the cold spray nozzle towards the region of the component at (304) includes at (305) cold spraying the powder towards a region of the component to form a deposit on the region of the component. As will be appreciated from the discussion of the embodiments above, the component may be formed of a parent material, the parent material being a superalloy or a titanium alloy and defining a parent material property value. Similarly, the deposit may define a deposit material property value equal to at least 50 percent of the parent material property, such as at least 75 percent of the parent material property, such as at least 90 percent of the parent material property.

In addition, for the aspect of the method 300 depicted, directing the cold spray mix through the cold spray nozzle towards the region of the component at (304) includes at (306) directing the powder towards the region of the component from an outlet of the cold spray nozzle at a powder exit velocity greater than 700 meters per second and less than 1300 meters per second. Further for the exemplary aspect of the method 300 depicted, directing the cold spray mix through the cold spray nozzle towards the region of the component at (304) includes at (307) providing the gas flow in the cold spray mix to an inlet of the cold spray nozzle at a gas temperature greater than 650 degrees Celsius and less than 1500 degrees Celsius, such as greater than 700 degrees Celsius. Further still for the exemplary aspect of the method 300 depicted, directing the cold spray mix through the cold spray nozzle towards the region of the component at (304) includes at (308) providing the gas flow in the cold spray mix to the inlet of the cold spray nozzle at a gas pressure greater than 30 bar and less than 100 bar.

Referring still to FIG. 4, the method 300 further includes at (312) rotating the component about an axis of the component while cold spraying powder onto the region of the component at (302). With such an exemplary aspect, the region of the component may be a circumferential region of the component.

In addition, the exemplary method 300 includes at (314) heat treating the component after cold spraying powder onto the region of the component. Heat treating the component at (314) after cold spraying the powder onto the region of the component may simply include heating the component to a treatment temperature in maintaining such component at the treatment temperature for an amount of time.

Further aspects of the invention are provided by the subject matter of the following clauses:

1. A method for adding material to a turbine engine component, the method including cold spraying a powder towards a region of the component to form a deposit on the region of the component, the component being formed of a parent material, the parent material being a superalloy or a titanium alloy and defining a parent material property value, and the deposit defining a deposit material property value equal to at least fifty percent of the parent material property value.

2. The method of any preceding clause wherein the deposit material property value is greater than 75 percent of the parent material property value and less than 200 percent of the parent material property value.

3. The method of any preceding clause wherein the deposit material property value is greater than 90 percent of the parent material property value.

4. The method of any preceding clause wherein the deposit material property value and the parent material property value are each describing the same material property, the material property being one of the following: a tensile strength, a yield strength, an elongation, a fatigue, a brittleness, a bulk modulus, a compressive strength, a creep, a ductility, an elasticity, a fatigue limit, a flexibility, a flexural strength, a fracture toughness, a hardness, a malleability, a plasticity, a resilience, a shear strength, a stiffness, or a toughness.

5. The method of any preceding clause wherein the deposit material property value and the parent material property value are each describing the same material property, the material property being one of the following: a tensile strength, a yield strength, a creep, a flexural strength, a shear strength, or a stiffness.

6. The method of any preceding clause wherein cold spraying the powder towards the region of the component comprises directing a cold spray mix comprising a cold spray gas and the powder through a cold spray nozzle of a cold spray system towards the region of the component, wherein the cold spray system defines a powder exit velocity at an outlet of the cold spray nozzle, wherein the powder exit velocity is greater than 700 meters per second and less than 1300 meters per second.

7. The method of any preceding clause wherein cold spraying the powder towards the region of the component comprises directing a cold spray mix comprising a cold spray gas and the powder through a cold spray nozzle of a cold spray system towards the region of the component, wherein the cold spray system defines a gas temperature at an inlet of the cold spray nozzle greater than 650 degrees Celsius and less than 1500 degrees Celsius.

8. The method of any preceding clause wherein the cold spray system defines a gas temperature at an inlet of the cold spray nozzle greater than 700 degrees Celsius.

9. The method of any preceding clause wherein cold spraying the powder towards the region of the component comprises directing a cold spray mix comprising a cold spray gas and the powder through a cold spray nozzle of a cold spray system towards the region of the component, wherein the cold spray system defines a gas pressure at an inlet of the cold spray nozzle greater than 30 bar and less than 100 bar.

10. The method of any preceding clause wherein the powder is a metal alloy powder.

11. The method of any preceding clause wherein the metal alloy powder comprises a Nickel alloy, a Titanium alloy, or a combination of the two.

12. The method of any preceding clause wherein the component is formed of a Nickel alloy, a Titanium alloy, or a combination of the two.

13. The method of any preceding clause wherein the component is a compressor case, a combustor case, or a turbine case for the turbine engine.

14. The method of any preceding clause wherein the nozzle is a converging and diverging nozzle.

15. A method for repairing a turbine engine component including cold spraying a powder towards a region of the component, wherein cold spraying the powder towards the region of the component comprises directing a cold spray mix comprising a cold spray gas and the powder through a cold spray nozzle of a cold spray system towards the region of the component, wherein the cold spray system defines a powder exit velocity at an outlet of the cold spray nozzle, wherein the powder exit velocity is greater than 700 meters per second and less than 1300 meters per second.

16. The method of any preceding clause wherein the cold spray system defines a gas temperature at an inlet of the cold spray nozzle greater than 650 degrees Celsius and less than 1500 degrees Celsius.

17. The method of any preceding clause wherein the cold spray system defines a gas temperature at an inlet of the cold spray nozzle greater than 700 degrees Celsius.

18. The method of any preceding clause wherein the cold spray system defines a gas pressure at the inlet of the cold spray nozzle greater than 30 bar and less than 100 bar.

19. A structural component for a gas turbine engine including a substrate formed of a superalloy or a titanium alloy and defining a repair region, the substrate defining a parent material property value; and a repair deposit cold sprayed onto the repair region of the substrate, the repair deposit defining a deposit material property value equal to at least fifty percent of the parent material property value.

20. The structural component of any preceding clause wherein the structural component is a compressor case, a combustor case, or a turbine case for the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for adding material to a turbine engine component, the method comprising:
   cold spraying a powder towards a region of the component to form a deposit on the region of the component, the component being formed of a parent material, the parent material being a superalloy or a titanium alloy and defining a parent material property value, and the deposit defining a deposit material property value equal to at least fifty percent of the parent material property value,
   wherein the deposit material property value and the parent material property value are each describing the same material property, the material property being one of the following: a tensile strength, a yield strength, an elongation, a fatigue, a brittleness, a bulk modulus, a compressive strength, a creep, a ductility, an elasticity, a fatigue limit, a flexibility, a flexural strength, a fracture toughness, a hardness, a malleability, a plasticity, a resilience, a shear strength, a stiffness, or a toughness, and
   wherein cold spraying the powder towards the region of the component comprises directing a cold spray mix comprising a cold spray gas and the powder through a cold spray nozzle of a cold spray system towards the region of the component, wherein the cold spray system defines a gas temperature at an inlet of the cold spray nozzle greater than 700 degrees Celsius and less than 1500 degrees Celsius.

2. The method of claim 1, wherein the deposit material property value is greater than 75 percent of the parent material property value and less than 200 percent of the parent material property value.

3. The method of claim 1, wherein the deposit material property value is greater than 90 percent of the parent material property value.

4. The method of claim 1, wherein the material property being one of the following: a tensile strength, a yield strength, a creep, a flexural strength, a shear strength, or a stiffness.

5. The method of claim 1, wherein cold spraying the powder towards the region of the component comprises directing a cold spray mix comprising a cold spray gas and the powder through a cold spray nozzle of a cold spray system towards the region of the component, wherein the cold spray system defines a powder exit velocity at an outlet of the cold spray nozzle, wherein the powder exit velocity is greater than 700 meters per second and less than 1300 meters per second.

6. The method of claim 1, wherein cold spraying the powder towards the region of the component comprises directing a cold spray mix comprising a cold spray gas and the powder through a cold spray nozzle of a cold spray system towards the region of the component, wherein the cold spray system defines a gas pressure at an inlet of the cold spray nozzle greater than 30 bar and less than 100 bar.

7. The method of claim 1, wherein the powder is a metal alloy powder.

8. The method of claim 7, wherein the metal alloy powder comprises a Nickel alloy, a Titanium alloy, or a combination of the two.

9. The method of claim 8, wherein the component is formed of a Nickel alloy, a Titanium alloy, or a combination of the two.

10. The method of claim 1, wherein the component is a compressor case, a combustor case, or a turbine case for the turbine engine.

11. The method of claim 6, wherein the cold spray nozzle is a converging and diverging nozzle.

12. A method for repairing a turbine engine component comprising:

forming a cold spray mix for utilization with a cold spray system, wherein the cold spray mix is formed from a cold spray gas flow and a provided flow of powder; and cold spraying the flow of powder towards a region of the component, wherein cold spraying the powder towards the region of the component comprises directing the cold spray mix through a cold spray nozzle of the cold spray system towards the region of the component, wherein the cold spray system defines a powder exit velocity at an outlet of the cold spray nozzle, wherein the powder exit velocity is greater than 700 meters per second and less than 1300 meters per second, wherein the cold spray system defines a gas temperature of the cold spray gas flow at an inlet of the cold spray nozzle, wherein the gas temperature is greater is than 700 degrees Celsius and less than 1500 degrees Celsius, and wherein the gas temperature and the powder exit velocity are configured such that the powder within the cold spray mix defines an energy level sufficiently high enough to assist with the effectiveness of the cold spray process while ensuring the powder does not change phase.

13. The method of claim 12, wherein the cold spray system defines a gas pressure at the inlet of the cold spray nozzle greater than 30 bar and less than 100 bar.

* * * * *